(12) United States Patent
Lee et al.

(10) Patent No.: US 7,584,499 B2
(45) Date of Patent: Sep. 1, 2009

(54) POLICY ALGEBRA AND COMPATIBILITY MODEL

(75) Inventors: Alfred M. Lee, Seattle, WA (US); Ashok Malhotra, Croton-on-Hudson, NY (US); Elliot Lee Waingold, Seattle, WA (US); Jeffery C. Schlimmer, Redmond, WA (US); Stephen J. Millet, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 11/102,848

(22) Filed: Apr. 8, 2005

(65) Prior Publication Data

US 2006/0230432 A1    Oct. 12, 2006

(51) Int. Cl.
    *H04L 9/00*     (2006.01)
    *G06F 17/00*     (2006.01)

(52) U.S. Cl. .......................... 726/1; 713/153; 713/172; 726/5; 726/14

(58) Field of Classification Search .......... 713/153, 713/172; 726/1, 5, 14
See application file for complete search history.

(56) References Cited

U.S. PATENT DOCUMENTS

| | | | | |
|---|---|---|---|---|
| 7,055,052 | B2* | 5/2006 | Chalasani et al. | 714/4 |
| 7,099,873 | B2* | 8/2006 | Agarwalla et al. | 707/10 |
| 7,233,935 | B1* | 6/2007 | Chandler | 706/47 |
| 7,305,432 | B2* | 12/2007 | Feng et al. | 709/203 |
| 7,433,835 | B2* | 10/2008 | Frederick et al. | 705/26 |
| 2003/0225723 | A1* | 12/2003 | Agarwalla et al. | 707/1 |
| 2004/0083243 | A1* | 4/2004 | Feng et al. | 707/203 |
| 2004/0103339 | A1* | 5/2004 | Chalasani et al. | 714/4 |
| 2005/0044197 | A1* | 2/2005 | Lai | 709/223 |
| 2005/0060365 | A1* | 3/2005 | Robinson et al. | 709/203 |
| 2005/0149940 | A1* | 7/2005 | Calinescu et al. | 718/104 |
| 2006/0041636 | A1* | 2/2006 | Ballinger et al. | 709/218 |
| 2006/0041669 | A1* | 2/2006 | Bemmel et al. | 709/229 |
| 2006/0047832 | A1* | 3/2006 | Betts et al. | 709/229 |
| 2006/0085243 | A1* | 4/2006 | Cooper et al. | 705/8 |
| 2006/0143704 | A1* | 6/2006 | Rits et al. | 726/17 |
| 2006/0153191 | A1* | 7/2006 | Rajsic et al. | 370/392 |
| 2006/0206440 | A1* | 9/2006 | Anderson et al. | 705/500 |
| 2006/0242101 | A1* | 10/2006 | Akkiraju et al. | 707/1 |
| 2006/0277606 | A1* | 12/2006 | Yunus et al. | 726/25 |

(Continued)

OTHER PUBLICATIONS

Box et al., Web Services Policy Framework (WS-Policy), Sep. 2004 <http://ftpna2.bea.com/pub/downloads/WS-Policy.pdf>.*

(Continued)

*Primary Examiner*—David García Cervetti
(74) *Attorney, Agent, or Firm*—Workman Nydegger

(57) ABSTRACT

The present invention provide for an algebraic mapping of a policy expression from a compact to a normalized form, both in Boolean and set formulations. The policy algebra is defined in such a way that policy alternatives within the normalized expression will be the same across equivalent compact expressions—regardless of how the assertions are arbitrarily constrained or what operators are used to constrain such equivalent expressions. Moreover, the present invention also provides a model for identifying alternatives that are equivalent by comparing only the root element names or QName of each assertion within an alternative. In addition, embodiments as described herein can utilize the identification of equivalent alternatives in order to create an intersection policy expression to limit alternatives of admissible behavior to those in common across both endpoints.

20 Claims, 10 Drawing Sheets

U.S. PATENT DOCUMENTS

| | | | |
|---|---|---|---|
| 2007/0056034 A1* | 3/2007 | Fernstrom | 726/20 |
| 2007/0156601 A1* | 7/2007 | Brew et al. | 705/57 |
| 2007/0288467 A1* | 12/2007 | Strassner et al. | 707/10 |
| 2008/0016554 A1* | 1/2008 | Rits | 726/4 |
| 2008/0022362 A1* | 1/2008 | Hinton et al. | 726/2 |
| 2008/0059633 A1* | 3/2008 | Hu | 709/225 |
| 2008/0098453 A1* | 4/2008 | Hinton et al. | 726/1 |

OTHER PUBLICATIONS

*XML Schema Part 1: Structures Second Edition*, (Henry S. Thompson, et al., eds., Oct. 28, 2004) *available at* http://www.w3.org/TR/xmlschema-1/.

*XML Schema Part 2: Datatypes Second Edition*, (Paul V. Biron & Ashok Malhotra, eds., Oct. 28, 2004) *available at* http://www.w3.org/TR/xmlschema-2/.

Christensen, et al., *Web Services Description Language (WSDL) 1.1*, Mar. 15, 2001, *available at* http://www.w3.org/TR/wsdl.

*XACML Profile for Web-Services*, (Tim Moses, ed. Sep. 5, 2003) *available at* http://lists.oasis-open.org/archives/xacml/200309/doc00000.doc.

*SOAP Version 1.2 Part 2: Adjuncts*, (Martin Gudgin, et al., eds., Jun. 24, 2003) *available at* http://www.w3.org/TR/2003/REC-soap12-part2-20030624/#soapfeatspec.

*Web Services Description Language (WSDL) Version 2.0 Part 1: Core Language*, (Roberto Chinnici, et al., eds., Aug. 3, 2004), *available at* http://www.w3.org/TR/2004/WD-wsdl20-20040803/#Feature.

*Web Services Description Language (WSDL) Version 2.0 Part 1: Core Language*, (Roberto Chinnici, et al., eds., Aug. 3, 2004) pp. 43-47, *available at* http://www.w3.org/TR/2004/WD-wsdl20-20040803/#Property.

Ross-Talbot, et al., *A Generalized RuleML-Based Declarative Policy Specification Language for Web Services*, *available at* http://www.w3.org/2004/08/ws-cc/srtst-20040903, 2004.

Rissanen, et al., *Administrative Delegation in XACML*, *available at* http://www.w3.org/2004/08/ws-cc/erbsf-20040902, 2004.

Gerald W. Edgar, *Position Paper for W3C Workshop on Constraints and Capabilities for Web Services*, *available at* http://www.w3.org/2004/08/ws-cc/geboeing-20040904, 2004.

Sedighi, et al., *Classification of the Current Constraint and Capabilities Protocols in Describing Web Services*, *available at* http://www.w3.org/2004/08/ws-cc/asej-20040903.

Glen Daniels, *Comparing Features / Properties and WS-Policy*, *available at* http://www.w3.org/2004/08/ws-cc/gdfpwsp-20040904.

Yves Lafon, *Constraints and Capabilities*, *available at* http://www.w3.org/2004/08/ws-cc/ylw3c-20040903.

Sun Microsystems, Inc., *Constraints and Capabilities for Web Services*, *available at* http://www.w3.org/2004/08/ws-cc/aaccws-20040827.

*Constraints & Capabilities of Web services Agents: A Look at the Current Situation*, (Hugo Haas, ed. Aug. 13, 2004), *available at* http://www.w3.org/2004/08/ws-cc/12-hh-ccw.

Kagal, et al., *Declarative Policies for Describing Web Service Capabilities and Constraints*, *available at* http://www.w3.org/2004/08/ws-cc/umbc-20040904.

Schlimmer, et al., *Expressing Requirements and Capabilities for Web Services*, *available at* http://www.w3.org/2004/08/ws-cc/jsklms-20040903.

Siebenlist, et al., *Grid-Centered Position Paper for the W3C Workshop on Constraints and Capabilities for Web Services*, *available at* http://www.w3.org/2004/08/ws-cc/grid-20040904.

Maryann Hondo, *IBM Position Paper for W3C Constraints/Capabilities*, *available at* http://www.w3.org/2004/08/ws-cc/mhibm-20040903.

*IONA Technologies Position Paper*, IONA Technologies, PLC, Oct. 12, 2004, *available at* http://www.w3.org/2004/08/ws-cc/rbcc-20040902.

Uszok, et al., *KAoS Policies for Web Services*, *available at* http://www.w3.org/2004/08/ws-cc/kaos-20040904.

Barstow, et al., *Nokia Position Paper for W3C Workshop on Constraints and Capabilities for Web Services*, *available at* http://www.w3.org/2004/08/ws-cc/abfhmm-20040903.

Lee, et al., *On Expressing Web Services Constraints & Capabilities*, *available at* http://www.w3.org/2004/08/ws-cc/mnbea-20040904, 2004.

Sycara, et al., *OWL-S Technology for Representing Constraints and Capabilities of Web Services*, *available at* http://www.w3.org/2004/08/ws-cc/dmowls-20040904.

Francis G. McCabe, *Policies are good for business*, Aug. 28, 2004, *available at* http://www.w3.org/2004/08/ws-cc/fmcp-20040806.

Alexander, et al., *Position Paper: W3C Workshop on Constraints and Capabilities for Web Services*, *available at* http://www.w3.org/2004/08/ws-cc/tblcja-20040904.

Malhotra, et al., *Position Paper for W3C Constraints and Capabilities Workshop*, *available at* http://www.w3.org/2004/08/ws-cc/amuy-20040903.

Paul Downey, *Publishing Web Service Policies*, British Telecommunications pic., *available at* http://www.w3.org/2004/08/ws-cc/pdbt-20040901.

Eric Prud'hommeaux, *RDF For Web Service Policy Assertions*, *available at* http://www.w3.org/2004/08/20-ws-pol-pos/.

Sahai, et al., *Specifying and Constraining Web Services Behaviour Through Policies*, *available at* http://www.w3.org/2004/08/ws-cc/hp-20040908.

David Booth, *Stretching WSDL 2.0*, *available at* http://www.w3.org/2004/06/dbooth-cc/cc.

Martin Dürst, *The Importance of Constraints and Capabilities for the Internationalization of Web Services*, *available at* http://www.w3.org/2004/09/duerst-constraints-position.

Berardi, et al., *Towards a First-Order Ontology for Semantic Web Services*, *available at* http://www.w3.org/2004/08/ws-cc/mci-20040904.

Ken Laskey, *W3C Workshop on Constraints and Capabilities for Web Services*, *available at* http://www.w3.org/2004/08/ws-cc/klmitre-20040904.

Bijan Parsia, *W3C Workshop on Constraints and Capabilities for Web Services*, *available at* http://www.w3.org/2004/08/ws-cc/bj-20040904.

Claus von Riegen, *W3C Workshop on Constraints and Capabilities for Web Services*, Sep. 1, 2004, *available at* http://www.w3.org/2004/08/ws-cc/cvrsap-20040903.

Vedamuthu, et al., *Web Services Capabilities, Requirements and Preference Profiles (WS-CRP Profiles)*, Aug. 25, 2004, *available at* http://www.w3.org/2004/08/ws-cc/crpp-20040903.

Arroyo, et al., *Web Service Capabilities and Constraints in WSMO*, Aug. 31, 2004, *available at* http://www.w3.org/2004/08/ws-cc/wsmo-20040903.

Addison P. Phillips, *Web Services and Internationalization*, *available at* http://www.w3.org/2004/08/ws-cc/i18n-20040902, 2004.

Barbir, et al., *Web Services Policy Considerations in Relation to NGN*, *available at* http://www.w3.org/2004/08/ws-cc/abwspern-20040902, 2004.

Christian de Sainte Marie, *Why We Need an XML Standard for Representing Business Rules*, *available at* http://www.w3.org/2004/08/ws-cc/cdsm-20040903, 2004.

Dale Moberg, *Workshop on Capabilities and Policies*, *available at* http://www.w3.org/2004/08/ws-cc/dmcp-20040817, 2004.

* cited by examiner

POLICY EXPRESSION A

```
<wsp:Policy>
  <wsp:ExactlyOne>
    <x:A1>abc</x:A1>
  </wsp:ExactlyOne>
  <wsp:ExactlyOne>
    <x:A2>def</x:A2>
  </wsp:ExactlyOne>
</wsp:Policy>
```
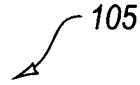
— 105

POLICY EXPRESSION B

```
<wsp:Policy>
  <wsp:All>
    <x:A1>abc</x:A1>
    <x:A2>def</x:A2>
  </wsp:All>
</wsp:Policy>
```
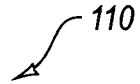
— 110

*Fig. 1*

COMPACT POLICY EXPRESSION C

— 205

```
                                          — 215
<wsp:Policy>
  <wsse:SecurityToken wsp:Optional="true" >
210 {   <wsse:TokenType>wsse:Kerberosv5TGT</wsse:TokenType>
  </wsse:SecurityToken>
</wsp:Policy>
```

NORMALIZED POLICY EXPRESSION C

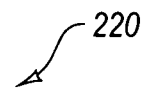
— 220

```
<wsp:Policy>
  <wsp:ExactlyOne>
    <wsp:All>
      <wsse:SecurityToken>
225 {     <wsse:TokenType>wsse:Kerberosv5TGT</wsse:TokenType>
      </wsse:SecurityToken>
    </wsp:All>
230 ─ <wsp:All />
  </wsp:ExactlyOne>
</wsp:Policy>
```

*Fig. 2A*

COMPACT POLICY EXPRESSION D

235

```
      <wsp:Policy>
255 ─── <wsp:ExactlyOne>
         <wsse:SecurityToken>
250 ┤      <wsse:TokenType>wsse:Kerberosv5TGT</wsse:TokenType>
         </wsse:SecurityToken>
         <wsse:SecurityToken>
260 ┤      <wsse:TokenType>wsse:X509v3</wsse:TokenType>
         </wsse:SecurityToken>
                                  ─── 270
       </wsp:ExactlyOne>
265 ─── <wssx:Audit wsp:Optional="true" />
      </wsp:Policy>
```

EXPANDED POLICY EXPRESSION D

240

```
      <wsp:Policy>
         <wsp:ExactlyOne> ─── 290
285 ─── <wsp:All>
         <wsse:SecurityToken>
250 ┤      <wsse:TokenType>wsse:Kerberosv5TGT</wsse:TokenType>
         </wsse:SecurityToken>
         </wsp:All>
285 ─── <wsp:All>
         <wsse:SecurityToken>
260 ┤      <wsse:TokenType>wsse:X509v3</wsse:TokenType>
         </wsse:SecurityToken>
         </wsp:All>
         </wsp:ExactlyOne>
         <wsp:ExactlyOne> ─── 290
275 ─── <wsp:All><wssx:Audit /></wsp:All>
280 ─── <wsp:All />
         </wsp:ExactlyOne>
      </wsp:Policy>
```

*Fig. 2B*

NORMAL FORM OF POLICY EXPRESSION D

```
290 ─┐  <wsp:Policy>                                                   ┌─ 245
     └─ <wsp:ExactlyOne>
285 ─── <wsp:All>
          ┌ <wsse:SecurityToken>
       202┤   <wsse:TokenType>wsse:Kerberosv5TGT</wsse:TokenType>
          │ </wsse:SecurityToken>
          └ <wssx:Audit />
285 ─── </wsp:All>
        <wsp:All>
          ┌ <wsse:SecurityToken>
       204┤   <wsse:TokenType>wsse:Kerberosv5TGT</wsse:TokenType>
          └ </wsse:SecurityToken>
285 ─── </wsp:All>
        <wsp:All>
          ┌ <wsse:SecurityToken>
       206┤   <wsse:TokenType>wsse:X509v3</wsse:TokenType>
          │ </wsse:SecurityToken>
          └ <wssx:Audit />
285 ─── </wsp:All>
        <wsp:All>
          ┌ <wsse:SecurityToken>
       208┤   <wsse:TokenType>wsse:X509v3</wsse:TokenType>
          └ </wsse:SecurityToken>
        </wsp:All>
      </wsp:ExactlyOne>
    </wsp:Policy>
```

*Fig. 2C*

POLICY EXPRESSION F

```
       ⎧  <wsp:Policy>
       ⎪    <wsp:OneOrMore>
       ⎪      <wsp:All>                                    ⎫ 305
       ⎪  325 ⎧ <x:A1>abc</x:A1>
       ⎪      ⎩ <x:A2 wsp:Optional="1" x="123" />
  340 ⎨      </wsp:All>
       ⎪  330 ── <x:A3 />
       ⎪      ⎧ <wsp:Not>
       ⎪  335 ⎨   <x:A4 wsp:Optional="1"/>
       ⎩      ⎩ </wsp:Not>
            </wsp:OneOrMore>
         ⎧ <wsp:Not>
     345 ⎨   <x:A5 wsp:Optional="1" y="123">abc</x:A5>
         ⎩ </wsp:Not>
         </wsp:Policy>
```

BOOLEAN FORM OF POLICY EXPRESSION F

```
     AND(
       OR(
         AND(                                              ⎫ 310
     350 ⎧ <x:A1>abc</x:A1>,
         ⎩ <x:A2 wsp:Optional="1" x="123" />,
  355 ──   ),
           <x:A3 />,
  395 ──   NOT(<x:A4 wsp:Optional="1" />),
         ),
  360 ──  NOT(<x:A5 wsp:Optional="1" y="123">abc</x:A5>)
       )
```

Fig. 3A

EXPANDED BOOLEAN FORM OF POLICY EXPRESSION F

```
      OR(
   ┌   AND( // a
365│     <x:A1 wsp:Optional="0" >abc</x:A1>,
   │     <x:A2 wsp:Optional="1" x="123" />,
   └     NOT(<x:A5 wsp:Optional="1" y="123">abc</x:A5>),
      ),
   ┌   AND( // b
370│     <x:A3 wsp:Optional="0" />,
   └     NOT(<x:A5 wsp:Optional="1" y="123">abc</x:A5>),
      ),
   ┌   AND( // c
375│     NOT(<x:A4 wsp:Optional="1" />),
   └     NOT(<x:A5 wsp:Optional="1" y="123">abc</x:A5>),
      )
      )
```

NORMAL FORM BOOLEAN OF POLICY EXPRESSION F

OR(

315

380 {
```
AND( // Alternative 1
  <x:A1>abc</x:A1>,
  <x:A2 x="123" />,
  NOT(<x:A5 y="123">abc</x:A5>)
),
AND( // Alternative 2
  <x:A1>abc</x:A1>,
  <x:A2 x="123" />,
),
AND( // Alternative 3
  <x:A1>abc</x:A1>,
  NOT(<x:A5 y="123">abc</x:A5>)
),
AND( // Alternative 4
  <x:A1>abc</x:A1>,
),
```

385 {
```
AND( // Alternative 5
  <x:A3/>,
  NOT(<x:A5 y="123">abc</x:A5>)
),
AND( // Alternative 6
  <x:A3/>
),
```

390 {
```
AND( // Alternative 7
  NOT(<x:A4/>),
  NOT(<x:A5 y="123">abc</x:A5>)
),
AND( // Alternative 8
  NOT(<x:A4/>)
),
AND( // Alternative 9
  NOT(<x:A5 y="123">abc</x:A5>)
)
AND () // Alternative 10
)
```

*Fig. 3C*

POLICY EXPRESSION P1

```
<wsp:Policy> // policy P1
  <wsp:All>
    <wsp:ExactlyOne>
      <A/>
      <B x='2' />
    </wsp:ExactlyOne>
    <C x='2' />
  </wsp:All>
</wsp:Policy>
```

425 { `<A/>`, `<B x='2' />` }
430 → `<C x='2' />`
405

POLICY EXPRESSION P2

```
<wsp:Policy> // policy P2
  <wsp:ExactlyOne>
    <wsp:All>
      <B x='3' />
      <C />
    </wsp:All>
    <E/>
  </wsp:ExactlyOne>
</wsp:Policy>
```

435 { `<B x='3' />`, `<C />` }
440 → `<E/>`
410

NORMALIZED POLICY EXPRESSION P1

```
<wsp:Policy>  // policy P1
   <wsp:ExactlyOne>
445─   <wsp:All><A /><C x="2" /></wsp:All>  // alternative A1
450─   <wsp:All><B x="2" /><C x="2" /></wsp:All>  // alternative A2
   </wsp:ExactlyOne>
</wsp:Policy>
```

NORMALIZED POLICY EXPRESSION P2

```
<wsp:Policy>  // policy P2
   <wsp:ExactlyOne>
455─   <wsp:All><B x="3" /><C /></wsp:All>  // alternative A3
460─   <wsp:All><E /></wsp:All>  // alternative A4
   </wsp:ExactlyOne>
</wsp:Policy>
```

*Fig. 4C*

INTERSECTION OF POLICY EXPRESSIONS Pi    ⎫ 420

```
<wsp:Policy>  // policy Pi
   <wsp:ExactlyOne>
465─   <wsp:All><B x="2" /><C x="2" /><B x="3" /><C /></wsp:All>
   </wsp:ExactlyOne>
</wsp:Policy>
```

*Fig. 4D*

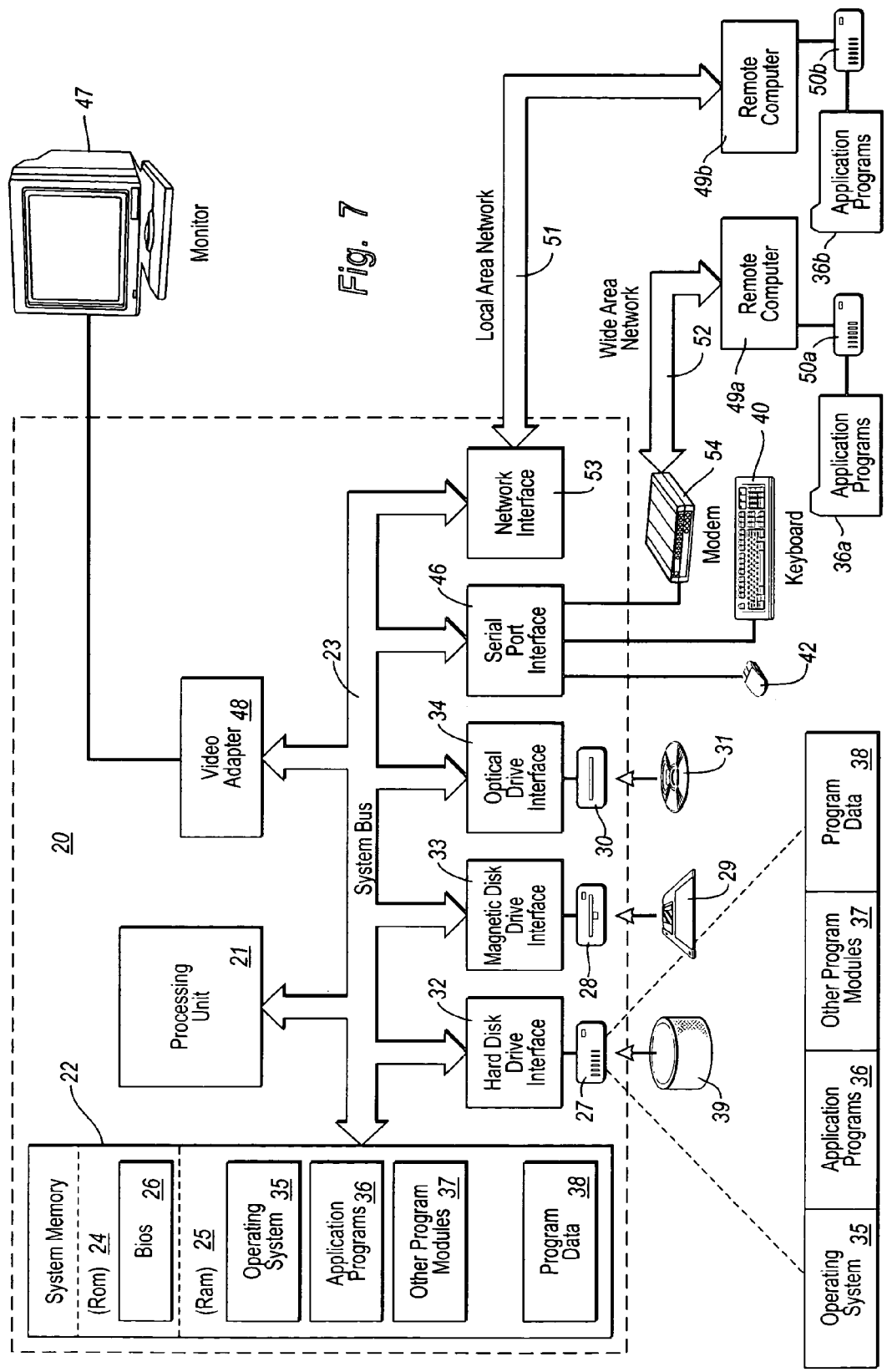

POLICY ALGEBRA AND COMPATIBILITY MODEL

CROSS-REFERENCE TO RELATED APPLICATIONS

N/A

BACKGROUND OF THE INVENTION

1. The Field of the Invention

The present invention generally relates to policies defined in a distributed system such as a web service environment. More specifically, the present invention provides a mechanism for normalizing policy expressions into concise policy alternatives for compatibility and compliance purposes.

2. Background and Related Art

Computer systems and related technology affect many aspects of society. Indeed, the computer systems' ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Web services have been a driving force in advancing such communications between systems and are turning the way we build and use software inside-out.

Web services let applications share data, and—more powerfully—invoke capabilities from other applications without regard to how those applications were built, what operating system or platform they run on, and what devices are used to access them. Web Services are invoked over networks, including the Internet, by means of industry-standard protocols including SOAP (Simple Open Access Protocol), XML (eXtensible Markup Language), UDDI (Universal Description Discovery Integration), WSDL (Web Service Description Language), etc. Although web services remain independent of each other, they can loosely link themselves into a collaborating group that performs a particular task.

Often, electronic communication in a web services environment includes a client computer system (hereafter referred to as a "client" and/or "requestor") requesting access to a network service (e.g., web services) at a server computer system (hereinafter referred to as a "service" and/or "provider"). Accordingly, the client sends a request to the service for particular access to its system resources, wherein if the client is authorized and validated the service responds with a response message providing the desired information. Of course, this request/response type communication (and other message exchange patterns) is governed by various requirements and capabilities defined typically by the service provider in what is termed web service policies or policy documents.

Web service policies define a framework and a model for expression of various requirements and capabilities as policies. Policy expressions allow for both simple and declarative assertions as well as more sophisticated conditional assertions. Further, some assertions specify traditional requirements and capabilities that will ultimately manifest on the wire (e.g., authentications scheme, transport protocol selection). Other assertions specify requirements and capabilities that have no wire manifestation yet are critical to proper service selection and usage (e.g., privacy policy, Quality of Service (QoS) characteristics, etc.). In any event, web service policies provide a single policy grammar to allow both kinds of assertions to be reasoned about in a consistent manner. Typical, web service policies define: (a) an XML data structure called policy expression which contains domain-specific web service policy information; and (b) a core set of grammar elements to indicate how the contained policy assertions apply. The policy document can be applied to any service or client to configure a web service communication for appropriate security, transports, reliability, transactions, etc.

The assertions within a policy expression may be constrained by a number of various logical operators. These operators may combine a group of assertions through such logical expressions as ExactlyOne, OneOrMore, All, or other similar semantics. In addition, the logical operators may be embedded or appear as attributes within the assertion itself. For example, the operators may define such things as whether or not the assertion is Required, Optional, Observed, and other similar constraints. In fact, these logical operators can be arranged in any number of ways to combine and constrain the assertions within a policy expression as per the desires of the service provider or developer. Although web service policies allow a developer a flexible and extensible model for expressing their requirements, capabilities, and general characteristics, there are still several shortcomings and downfalls to such an expansive model.

For example, distributing endpoints often support more than one mechanism of formatting, communicating, and securing messages. To allow two endpoints to determine if they share any of these mechanisms, they need a common way to express acceptable alternatives and to determine if they have any compatible alternatives. Because of the expansive and varied use of the operators for expressing one's policy, however, it is often times difficult to determine such compatibility. For example, consider the hypothetical policy expressions shown in FIG. 1. Policy expression A 105 uses two ExactlyOne operators to express the equivalent of the All operator in policy expression B 110.

Although this simple example of two seemingly different policy expression can be easily identified by a human as equivalent, more complex policy expression are not so easily recognizable. In addition, it is obviously desirable to have the recognition of an endpoint's capabilities, requirements, and general characteristics automated. Note, however, that a string-to-string comparison of the two seemingly different policy expressions in FIG. 1 would yield an indication that the two policy expressions 105, 110 were different.

Moreover, web service policies and other works do not define a mechanism to represent consistent alternatives across one's requirements. For instance, an endpoint might support text encoding where the connection channel is shared for multiple messages and where messages are secured using transport-layer security. Alternatively, an endpoint might support binary encoded messages that are streamed one per connection where the messages are secured using message-level security. Currently, however, there is no mechanism for expressing such capabilities as alternatives. As a further consequence of not providing a mechanism for expressing policy alternatives, current policy models do not provide a way to support versioning of different applications. Additionally, current systems do not define a way to determine compatibility between alternatives supported by different endpoints. Instead, web services and other systems simply assume that policies are expressed from the point of view of one endpoint (typically the service provider) and imposed on the other (the client).

Accordingly, there exists a need for a policy framework that provides an extensible model for: (1) expressing individual capabilities and requirements as consistent alternatives; and (2) determining compatibility between two such policy alternatives.

BRIEF SUMMARY OF THE INVENTION

The above-identified deficiencies and drawbacks of current web service policy models are overcome through exemplary embodiments of the present invention. For example, the present invention provides systems, methods, and computer program products for assisting an endpoint in complying with a policy expression by applying an algebraic solution for normalizing the policy expression into a complete list of policy alternatives. Once the policy expressions are normalized into policy alternatives, the present invention also provides for determining the equivalents of two policy alternatives by comparing the root element name (e.g., qualified name) of assertions within each policy alternative. Such determination may then be used to generate an intersection policy agreement between two endpoints.

For example, one embodiment of the present invention provides for accessing a policy expression defined by policy assertions. The policy assertions are arbitrarily constrained by a configuration of logical operators in that the policy expression can also be defined by constraining the policy assertions to a different configuration of available logical operators. Based on the configuration of logical operators, this embodiment further provides a policy algebra that is utilized to expand the policy expression into a normal form of policy alternatives corresponding to each possible combination of the policy assertions that will satisfy the policy expression. Thereafter, the policy alternatives are presented to an endpoint for identifying one of the policy alternatives to use in complying with the policy expression.

In another example embodiment, a first policy alternative from a normal form of a first policy expression is received. The first policy alternative including one or more policy assertions that will satisfy the first policy expression. A second policy alternative from a normal form of a second policy expression is also received. The second policy alternative similarly including one or more policy assertions that will satisfy the second policy expression. The root element names for the one or more policy assertion within the first policy alternative are then compared with the root element names for the one or more policy assertion within the second policy alternative. Based on the comparison, it is determined if the first and second policy alternatives are equivalents in order to establish the compatibility of the first and second policy expressions.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example of two equivalent policy expressions using different logical operators;

FIG. 2A illustrates an example of a policy expression in compact form that is normalized in accordance with example embodiments of the present invention;

FIG. 2B illustrates an example of a compact policy expression that is expanded in accordance with example embodiment of the present invention;

FIG. 2C illustrates an example of a policy expression that has been transformed into normal form in accordance with example embodiments of the present invention;

FIG. 3A illustrates the conversion of a set form of policy expression into Boolean form in accordance with example embodiments of the present invention;

FIG. 3B illustrates an expanded Boolean form of a policy expression in accordance with example embodiments of the present invention;

FIG. 3C illustrates the disjunctive normal form of a Boolean policy expression in accordance with example embodiments of the present invention;

FIG. 4C illustrates the normalization of two hypothetical policy expressions in accordance with example embodiments of the present invention;

FIG. 4D illustrates the intersection of two hypothetical policy expressions in accordance with example embodiments of the present invention;

FIG. 7 illustrates an example system that provides a suitable operating environment for the present invention.

DETAILED DESCRIPTION OF THE PREFERRED EMBODIMENTS

Figures 4A, 4B:
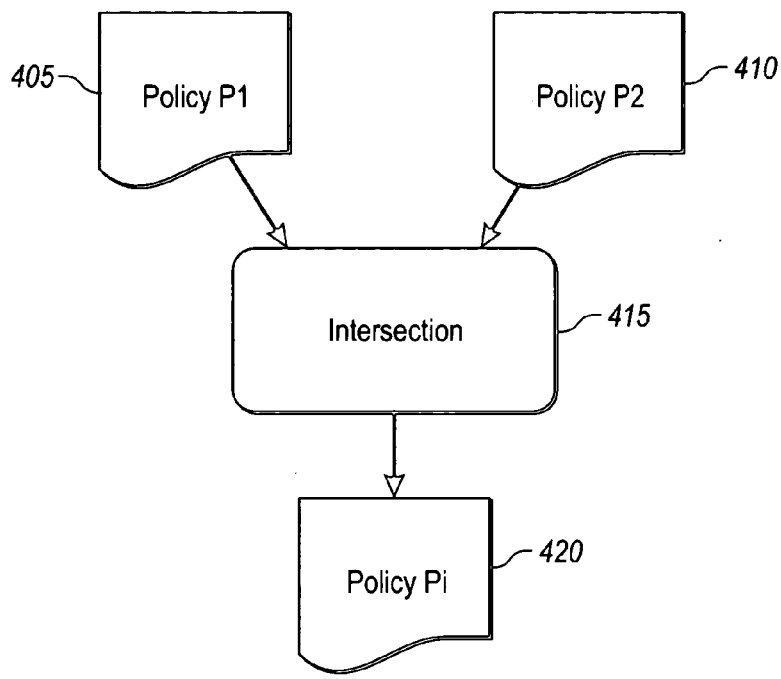
FIG. 4A illustrates the intersection of two policy expressions in accordance with example embodiments of the present invention.
FIG. 4B illustrates two hypothetical policy expressions to be intersected in accordance with example embodiments of the present invention.

The present invention extends to methods, systems, and computer program products for normalizing a policy expression into a complete list of policy alternatives and identifying those alternatives that are equivalent. The embodiments of the present invention may comprise a special purpose or general-purpose computer including various computer hardware components or modules, as discussed in greater detail below.

Prior to discussing the present invention in great detail, the following provides a list of terms used throughout the application in accordance with example embodiments. A "policy expression" (or just "expression") is a data representation (e.g., a XML Infoset) of a collection of policy assertions either in a normal or other equivalent arbitrary form—as described in greater detail below. A "policy assertion" (or just "assertion") represents individual requirements, capabilities, or other general characteristics of an entity (e.g., endpoint, service provider, client, etc.). Assertions typically indicate domain-specific (e.g., security, transactions, reliability, etc.) semantics. Assertions are identified by a root element name, e.g., a "qualified name" or "QName", which is defined by a namespace and local name properties of the root element information item representing the assertion. For example, an assertion with a root element QName of "wsse:Confidentiality" includes a namespace prefix of "wsse" (which is mapped to a unique resource identifier (URI)) and a local name of "Confidentiality".

The data set of an assertion may contain a non-empty attributes property and/or a non-empty children property. Such content may be used to parameterize the behavior indicated by the assertion. For example, an assertion identifying support for a specific reliable messaging mechanism might include an attribute to indicate how long an endpoint will wait before sending an acknowledgement. Additional assertion content, however, is not required when the identity of the root element information item alone is enough to convey the requirement, capability, or general characteristics.

Assertions are constrained within a policy expression by "logical operators" (or just "operators") in either a normalized or arbitrary form. Operators can combine assertions using logical set formulations such as "ExactlyOne," "OneOrMore," "All," etc. Further, operators may be part of the attributes of an assertion, for example an attribute may be constrained by objects such as "Optional," "Required," "Ignored," "Rejected," "Observed," etc. In addition, these constraints may be further defined by items indicating the absence or presence of such operators, e.g., Optional="true" or "false."

A "policy alternative" (or just "alternative") in accordance with example embodiments is a potentially empty collection of policy assertions in normalized form—as described in greater detail below. A policy alternative with zero policy assertions indicates no behaviors. An alternative with one or more assertions indicates behaviors implied by those, and typically only those assertions. In addition, as described in greater detail below, example embodiments provide that assertions within an alternative may not be ordered, and thus behaviors (indicated by assertions) as applied to a subject may occur in any order.

A "policy term" (or just "term"), on the other hand, is a potentially empty collection of policy assertions in a compact form—as described in greater detail below. The assertions within a term are typically arbitrarily constrained in that the policy expression containing such terms may be defined by constraining the assertion in a different configuration of logical operators, such as the case described previously in regards to FIG. 1. Note, however, that policy terms may also be an alternative when already reduced to normalized form, yet combined with other non-normalized terms, as described below.

Example embodiments of the present invention provide for an algebraic mapping of a policy expression from a compact to a normalized form, both in Boolean and set formulations. The policy algebra is defined in such a way that policy alternatives within the normalized expression will be the same across equivalent compact expressions—regardless of how the assertions are arbitrarily constrained or what operators are used to constrain such equivalent expressions. Moreover, the present invention also provides a model for identifying alternatives that are equivalent by comparing only the root element name (e.g., QName) of each assertion within an alternative. Such matching of assertion types using the root element or QName places minimal requirements on the design of assertions, while providing a way to determine compatibility without extensive knowledge of each assertion.

In addition, embodiments as described herein can utilize the identification of equivalent alternatives in order to create an intersection policy expression to limit alternatives of admissible behavior to those in common across both endpoints.

As will be appreciated, the policy alternatives—and mechanisms for comparing such—described herein advantageously allow for versioning, such that as additional versions or other upgrades for applications occur, an endpoint can still support both legacy and updated versions. Similarly, other functionalities that an endpoint may find as acceptable options can also be expressed as policy alternatives, thereby supporting a broader base of endpoint capabilities. In addition, by using root element names (i.e., QNames) for determining compatibility and intersection, hints and other expressions can be preserved and utilized according to the needs of various applications.

In order to convert a policy expression from compact to normalized form, the present invention provides the following description and examples of policy algebraic models or functions. As will be shown in the examples below, these functions can then be recursively used to covert the arbitrary constraints imposed by the logical operators into a list of policy alternatives, each of which independently define the requirements, capabilities, and/or general characteristics that will satisfy the policy expression. It should be noted that although the use of these models may be used in a particular order to convert a policy expression from a compact to normalized form, the order of the functions can typically be interchangeable. Accordingly, any particular ordering or use of the models as described below is for illustrative purposes only and is not meant to limit or otherwise narrow the scope of the present invention unless explicitly claimed.

One model used in converting a compact policy assertion or expression to normalized form defines a set formulation for constraining a policy assertion using the Optional operator. As described herein, to indicate that a policy assertion is optional, an attribute is defined that is a syntactic shortcut for expressing policy alternatives with and without the assertion. The schema outline for this attribute is as follows:

<Assertion [ wsp:Optional="xs:boolean" ]? . . . > . . . </Assertion> wherein the "xs:boolean" value can be set to "true" or "false," as described below. Note, however, that other schema and syntax are also available to the present invention. For example, the Optional operator may be a root or child element rather than an attribute of an assertion. Alternatively, or in conjunction, the xs:boolean value may be expressed in other terms such as '1' for true or '0' for false. Accordingly, the schema and/or syntax used to describe the Optional operator, and other operators as described herein, are for illustrative purposes only and are not meant to limit or otherwise narrow the scope of the present invention unless explicitly claimed.

In any event, if the Optional operator value is true, example embodiments provide that the functionality of the assertion is semantically equivalent to the following set formulation:

<wsp:ExactlyOne>
  <wsp:All><Assertion . . . > . . . </Assertion></wsp:All>
  <wsp:All />
</wsp:ExactlyOne>

In other words, the Optional attribute when true creates two alternatives: one of which is the assertion itself, and another one is an empty set.

If, however, the Optional operator is false, the functionality of the assertion is semantically equivalent to the following:

<wsp:ExactlyOne>
  <wsp:All><Assertion . . . > . . . </Assertion></wsp:All>

</wsp:ExactlyOne>

Accordingly, the Optional attribute being false creates a single alternative of the assertion itself.

Example embodiments provide that omitting this attribute or operator is semantically equivalent to including it with a value of false. Policy expressions typically should not include this attribute or operator with a value of false, but policy parsers should be configured to accept this attribute or operator with such a value.

FIG. 2A illustrates an example of converting a compact policy expression with an attribute or operator of Optional into a normalized set formulation. As shown, compact policy expression "C" 205 includes a policy term 210 with an Optional attribute value 215 of "true." Applying the equivalent function described above yields the normalized policy expression "C" 220. In other words, the Optional operator 215 indicates that the assertion in 210 is to be included in policy alternative 225, while excluded from assertion 230. Note that Optional attribute does not appear in the normalized form of policy expression "C" 220.

As will be further illustrated in other examples below, embodiments within the invention also provide that other operators may be mapped or translated to some value of Optional operator in combination with a Not operator (e.g., wsp:Not, or Boolean NOT). For example, a Required operator may be converted into an Optional value of false with a Not operator value also of false (indicating that the attribute will not appear as absent or excluded). A Rejected operator, on the other hand, may map to an Optional=false while being excluded by a Not=true operator, without appearing as absent. In contrast, an Ignored operator or attribute translates into an Optional=true, with a Not=false, yet appearing as absent. Further note, that an Optional=true maps to both an Optional=true and a Not=true, and also appears as absent. The following table illustrates the above described mapping of wsp:Operators into wsp:Optional and wsp:Not operators, wherein '0'=false and '1'=true:

| wsp:Operator | wsp:Optional and wsp:Not | Appear as Absent |
| --- | --- | --- |
| wsp:Required | wsp:Optional = '0'; wsp:Not = '0' | No |
| wsp:Rejected | wsp:Optional = '0'; wsp:Not = '1' | No |
| wsp:Ignored | wsp:Optional = '1'; wsp:Not = '0' | Yes |
| wsp:Optional | wsp:Optional = '1'; wsp:Not = '1' | Yes |

Note the operator Observed does not map to the above formalism. This is due in part to the fact that such operator seems to indicate advertised policies for a service or endpoint as a whole rather than individual assertions. Further note, that the above mapping of operators to Optional and Not are not all inclusive. In addition, these and other operators may be expressed in other values of other operators. Accordingly, the above mappings of various operators to Optional and Not operators are for illustrative purposes only and are not meant to limit or otherwise narrow the scope of the present invention unless explicitly claimed.

As previously mentioned, in order to compactly express complex policies, policy operators may be recursively nested; e.g., one or more instances of wsp:Policy, wsp:All, wsp:OneOrMore, and/or wsp:ExactlyOne may be nested within wsp:Policy, wsp:All, OneOrMore, and/or wsp:ExactlyOne. Note that although the previous and some of the following examples refer to specific namespaces, local names, attributes, operators, or other specific policy expressions, embodiments described herein should be broadly construed to encapsulate any number of expressions, assertions, attributes, etc. Accordingly, the use of any specific syntax or specification as described herein (e.g., wsp:All, etc., as defined in web service policy) is for illustrative purposes only and is not meant to limit or otherwise narrow the scope of the present invention unless explicitly claimed.

The following formulations and rules may be used to transform a compact policy expression into a normal form of a policy expression. For example, wsp:Policy is equivalent to wsp:All. In an empty set, <wsp:All /> expresses a policy with zero policy assertions. Note that since wsp:Policy is equivalent to wsp:All, <wsp:Policy /> is therefore equivalent to <wsp:All />, i.e., a policy alternative with zero assertions. Similarly, <wsp:ExactlyOne /> and/or <wsp:OneOrMore /> expresses a policies with zero policy alternatives.

In line with the previous statements that policy assertions within a policy alternative and policy alternatives within a policy are not ordered, operations such as wsp:All, wsp:ExactlyOne, and wsp:OneOrMore are commutative. For example,
<wsp:All><!-- assertion 1--><!-- assertion 2--></wsp:All> is equivalent to:
<wsp:All><!-- assertion 2--><!-- assertion 1--></wsp:All> and;
<wsp:ExactlyOne>
   <!-- assertion 1--><!-- assertion 2-->
</wsp:ExactlyOne> is equivalent to:
<wsp:ExactlyOne>
   <!-- assertion 2--><!-- assertion 1-->
</wsp:ExactlyOne> and;
<wsp:OneOrMore>
   <!-- assertion 1--><!- - assertion 2-->
</wsp: OneOrMore> is equivalent to:
<wsp: OneOrMore>
   <!-- assertion 2--><!-- assertion 1-->
</wsp: OneOrMore>

Other embodiments provide that operations are associative. For example,
<wsp:All>
   <!-- assertion 1-->
   <wsp:All><!-- assertion 2--></wsp:All>
</wsp:All> is equivalent to:
<wsp:All><!-- assertion 1--><!-- assertion 2--></wsp:All> and;
<wsp:ExactlyOne>
   <!-- assertion 1-->
   <wsp:ExactlyOne><!-- assertion 2--></wsp:ExactlyOne>
</wsp:ExactlyOne> is equivalent to:
<wsp:ExactlyOne>
   <!-- assertion 1--><!-- assertion 2-->
<wsp:ExactlyOne>

Further, operations as described herein may be idempotent. For example in the case of wsp:All and wsp:ExactlyOne,
<wsp:All>
   <wsp:All><!-- assertion 1--><!-- assertion 2--></wsp:All>
</wsp:All> is equivalent to:
<wsp:All><!-- assertion 1--><!-- assertion 2--></wsp:All>
and;
<wsp:ExactlyOne>
    <wsp:ExactlyOne>
        <!-- assertion 1--><!-- assertion 2-->
    </wsp:ExactlyOne>
</wsp:ExactlyOne> is equivalent to:
<wsp:ExactlyOne>
    <!-- assertion 1--><!-- assertion 2-->
</wsp:ExactlyOne>

In addition, other embodiments provide that the operations may be distributive. For example, wsp:All distributes over wsp:ExactlyOne as follows, <wsp:All>
    <wsp:ExactlyOne>
        <!-- assertion 1-->
        <!-- assertion 2-->
    </wsp:ExactlyOne>
    <wsp:ExactlyOne>
        <!-- assertion 3-->
        <!-- assertion 4-->
    </wsp:ExactlyOne>
</wsp:All> is equivalent to:
<wsp:ExactlyOne>
    <wsp:All><!-- assertion 1--><!-- assertion 3--></wsp:All>
    <wsp:All><!-- assertion 1--><!-- assertion 4--></wsp:All>
    <wsp:All><!-- assertion 2--><!-- assertion 3--></wsp:All>
    <wsp:All><!-- assertion 2--><!-- assertion 4--></wsp:All>
</wsp:ExactlyOne>

Similarly,
<wsp:All>
    <wsp:ExactlyOne>
        <!-- assertion 1-->
        <!-- assertion 2-->
    </wsp:ExactlyOne>
</wsp:All> is equivalent to:
<wsp:ExactlyOne>
    <wsp:All>
        <!-- assertion 1-->
    </wsp:All>
    <wsp:All>
        <!-- assertion 2-->
    </wsp:All>
</wsp:ExactlyOne>

Other embodiments provide that distributing wsp:All over an empty wsp:ExactlyOne is equivalent to no alternatives. For example, <wsp:All>
    <wsp:ExactlyOne>
        <!-- assertion 1-->
        <!-- assertion 2-->
    </wsp:ExactlyOne>
    <wsp:ExactlyOne />
</wsp:All> is equivalent to:
<wsp:ExactlyOne />

Recursively using the above identified algebraic models or functions, example embodiments provide that a compact policy expression may be transformed into a normal form of policy alternatives. For example, as shown in FIG. 2B, a compact policy expression "D" 235 includes two assertions 250 and 260 enclosed by a wsp:ExactlyOne operator 255 and a wssx:Audit assertion 265 with an Optional=true operator shown as an attribute. Applying the above formulation for Optional=true to wssx:Audit assertion 265, and applying the implied value of Optional=false for assertions 250 and 260 yields the expanded policy expression "D" 240 in FIG. 2B. Note that the wssx:Audit assertion 265 expands into the two alternatives 275 and 280, while the other two assertions 250 and 260 remain unchanged except for the enclosure of the wsp:All operators 285s.

Finally, noting that wsp:Policy is equivalent to wsp:All, and distributing wsp:All over wsp:ExactlyOne yields the normal form policy expression "D" 245 shown in FIG. 2C. Note that the two alternatives 250 and 260 are combined with the two alternatives 275 and 280 to create four alternatives 202, 204, 206, and 208 in the normalized policy 245. Further note that the top-level operator is an ExactlyOne 290, which encloses the four alternatives 202, 204, 206, and 208 denoted by the All operators 285. As such, any one of the alternatives 202, 204, 206, and 208 will satisfy the policy expression 245.

As previously noted, although the above policy expression (as well as others described herein) was converted into normalized form using the models in a certain order, the present invention is not limited to any such ordering. For example, the distribution of wsp:All over wsp:ExactlyOne operation may have been performed before applying the algebraic rules for wsp:Optional. In such instances, however, algebraic rules previously applied may need to be recursively reapplied in order to convert an expression into normal form. Nevertheless, any specific order of the rules for converting a policy expression from compact to normal form is used for illustrative purpose only and is not meant to limit or otherwise narrow the scope of the present invention unless explicitly claimed.

As can easily be seen from the above example, an endpoint (e.g., client) may obtain a compact policy expression from another endpoint and convert it into a normalized form by recursively using the above example algebraic models. Accordingly, an endpoint may then choose an appropriate alternative that it is capable of complying with based on its capabilities, versioning it supports, or other limitations it has. In addition, as described in greater detail below, an endpoint may choose an alternative that conforms to it's own policy expression or one that best suits it's own requirements, capabilities, and/or general characteristics.

Other alternative embodiments also provide for presenting a policy expression in normalized form to an endpoint through the use of Boolean operators. For example, FIG. 3A illustrates a policy expression "F" 305, with three terms 325, 330, and 335 enclosed by a wsp:OneOrMore operator 340, with another term 345 outside the wsp:OneOrMore operator. The policy expression "F" is then converted into Boolean form 310 using Boolean operators AND, OR, and NOT to enclose similar terms 350, 355, 395, and 360. Note that although this example only uses the Boolean logic operators AND, OR, and NOT other operators may also be used where appropriate, e.g., XOR, XNOR, NAND, NOR, etc. In addition, other operators such as Optional, Required, Rejected, Ignored, Observed, etc. may also be used in conjunction with such Boolean operators, as described below.

Next, in FIG. 3B, the policy expression "F" is expanded 320 into a semi-normal form consisting of a top-level OR enclosing terms 365, 370, and 375, which are enclosed in AND operators. This expanded Boolean form of policy expression "F" 320 is further normalized as shown in FIG. 3C to create disjunctive normal form 315. In this example, the wsp:Optional attributes are removed in a similar manner as described above using the Optional operator algebraic model. As shown, // Alternatives 1-4 in lines 380 were expanded from term 365, // Alternatives 5 and 6 in lines 385 correspond to term 370, and // Alternatives 7-10 in lines 390 where formed from term 375.

As previously mentioned, policy intersection is useful when two parties express a policy and want to limit the policy (alternatives of admissible behavior) to those in common across both parties' policies. For example, when a sender and a receiver express requirements on messages to be sent from the sender to the receiver, intersection identifies policy alternatives admissible by both sender and receiver. Intersection identifies those alternatives (if any) deemed admissible by both policies. This can be thought of as pruning the input policies to produce an output policy that is common to both. Note, however, that in accordance with example embodiments intersection does not necessarily need to create a separate policy document, but may simply be used to identify those alternatives that are common to both policy expressions. Accordingly, the following discussion of creating an intersection policy expression when comparing policy alternatives is used for illustrative purposes only and is not meant to limit or otherwise narrow the scope of the present invention unless explicitly claimed.

Intersection may be described as a function that typically takes two policies and returns a policy. Intersection is typically defined over two arguments: I(P1, P2)→$P_i$ and is, among other things, commutative and associative. As shown in FIG. 4A, the intersection 415 between two input policies P1 (405) and P2 (410) is a policy Pi (420), which includes one or more policy alternatives $A_i$ in accordance with the following rule. Given some policy alternative $A_x$ in P1 (405) and some alternative $A_y$ in P2 (410) such that the vocabulary (i.e., the root element name or QName of each assertion within $A_x$ and $A_y$) of $A_x$=the vocabulary of $A_y$; then the assertion expressions in $A_i$ are the assertions expressions in $A_x$ and the assertion expressions in $A_y$. Note that although example embodiments use the full root name element for an assertion when comparing alternatives, other embodiments allow for other portions of the assertion to be compared with other assertions of another alternative.

In any event, the following statements flow from the above definition of intersection. The vocabulary of $A_i$=the vocabulary of $A_x$=the vocabulary of $A_y$. Further, when the vocabularies of the two input policies overlap but are different, the vocabulary of the intersection of those policies is a subset of the vocabulary of the input policies. In other words, when the root element names of each assertion within each alternative match, but the attributes within the corresponding assertions do not, then the intersection of those policies includes alternatives of each set of assertions. Alternatively, if the vocabulary of one policy includes an assertion name that is not in the vocabulary of another policy, then the behavior associated with that assertion name is not admissible in the intersection of those policies.

As an example of intersection, consider the two input policy expressions P1 (405) and P2 (410) in FIG. 4B. As shown policy expression P1 (405) includes two terms 425 and 430, comprising assertions <A />, <B x='2' /> and <C x='2' />, respectively. Similarly, policy expression P2 (410) includes two terms 435 and 440, which include <B x='3' />, <C /> and <E />, respectively. Converting these policy expressions into normalized form in accordance with the above described embodiments yields the normalized policy expressions in FIG. 4C, wherein policy P1 (405) has two alternatives 445 and 450 and policy P2 also has two alternatives 455 and 460. Because there is only one alternative 450 in policy P1 (405) with the same vocabulary (i.e., same root element names <B>, <C>) as another alternative 455 in policy P2 (410), the intersection is a policy Pi (420) with a single alternative 465 that is the union of alternative 450 and 455, as shown in FIG. 4D. Note also that because the attributes (or children) properties of each assertion with the alternatives 450, 455 may not match, each assertion is included in the alternative 465 for the intersection policy expression Pi (420).

Also note that in order to compare the root element names or QNames for alternatives with multiple assertions, it may be advantageous to put them in alphabetical or some other ordering. Accordingly, example embodiments support such rules for ordering the assertions; although there may be many various rules for arranging assertions in some type of order for efficiency purposes. Nevertheless, the assertions within an alternative may be randomly arranged since assertions are commutative within an alternative. In such instance, embodiments also allow for trying different permutations of the arrangement of assertions for a given alternative in order to determine equivalents. Of course, any other well known way of arranging objects to determine equivalents is also available to the present invention. Accordingly, any specific ordering of assertions for comparison is used herein for illustrative purposes only and is not meant to limit or otherwise narrow the scope of the present invention unless explicitly claimed.

The above described usage of comparing only the root element name or QName of assertions when determining equivalents of alternatives has several advantageous features over other possible comparison mechanisms. For example, one approach may be to require that all content within an alternative must match for equivalents. This constraint, however, would not allow for extensions such as hints, comments, or other minor modifications and versioning. Another option may be to allow a developer to include any content within an alternative; yet require that they specify in, e.g., some blob what data must match. Such a requirement, however, puts a heavy burden on the developer and is prone to errors when not properly configured. By comparing the root element name or QName for determining equivalent assertions (and correspondingly equivalent alternatives) the present invention allows for virtually no constraints on how a developer will write a policy alternative.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flowchart for FIGS. 5 and 6—is used to indicate the desired specific use of such terms.

Figure 5:
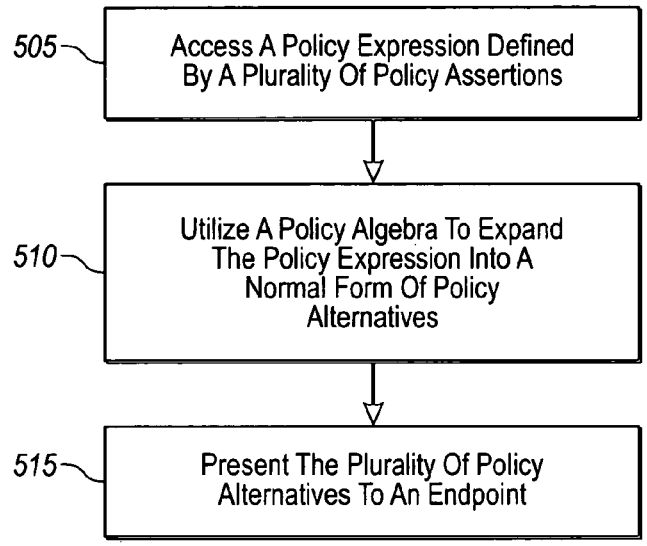
FIG. 5 illustrates a flow diagram of a method of assisting an endpoint in complying with a policy expression in accordance with example embodiments of the present invention.

FIG. 5 illustrates a flow diagram of a method 500 of assisting an endpoint in complying with a policy expression by applying an algebraic solution for normalizing the policy expression into a complete list of policy alternatives that the endpoint may select from. Method 500 includes an act of accessing 505 a policy expression defined by a plurality of policy assertions. The policy assertions arbitrarily constrained by a first configuration of logical operators in that the policy expression can also be defined by constraining the plurality of policy assertions to a different configuration of available logical operators. In a Boolean policy expression, the values for the available logical operators may include AND, OR, XOR, XNOR, NAND, NOR, NOT, Optional, Required, Rejected, Ignored, Observed, etc. Similarly, in the set formulation the values for the available logical operators may include ExactlyOne, OneOrMore, All, Optional, Required, Rejected, Ignored, Observed, etc.

Based on the configuration of logical operators, method 500 further includes an act of utilizing 510 a policy algebra to expand the policy expression into a normal form of policy alternatives. In other words, based on the operators used, and utilizing various algebraic models described herein, example embodiments expand a compact policy expression into a normalized form of policy alternatives corresponding to each possible combination of one or more of the plurality of policy assertions that will satisfy the policy expression.

If the policy expression is in Boolean logic operator form, example embodiments provide that the normal form of the policy expression includes a top-level OR logical operator enclosing the plurality of policy alternatives and each policy alternative from the plurality of policy alternatives are enclosed by AND logical operators. Alternatively, if the policy expression is in set formulation, the normal form of the policy expression includes a top-level ExactlyOne operator enclosing the plurality of policy alternatives and each policy alternative from the plurality of policy alternatives are enclosed by All operators. Further, whether in Boolean or set form, the operators as defined and modeled above may be commutative, associative, idempotent, distributive, etc. in order to normalize the policy expression. In addition, if an operator value is an Optional value in an assertion, the policy algebra defines that the plurality of alternatives includes two policy alternatives: one policy alternative including the first assertion; and one policy alternative without the first assertion.

In any event, after normalizing the policy expression, method 500 further includes an act of presenting 515 the plurality of policy alternatives to an endpoint. Accordingly, an endpoint may then identify one of the plurality of policy alternatives to use in complying with the policy expression.

Figure 6:
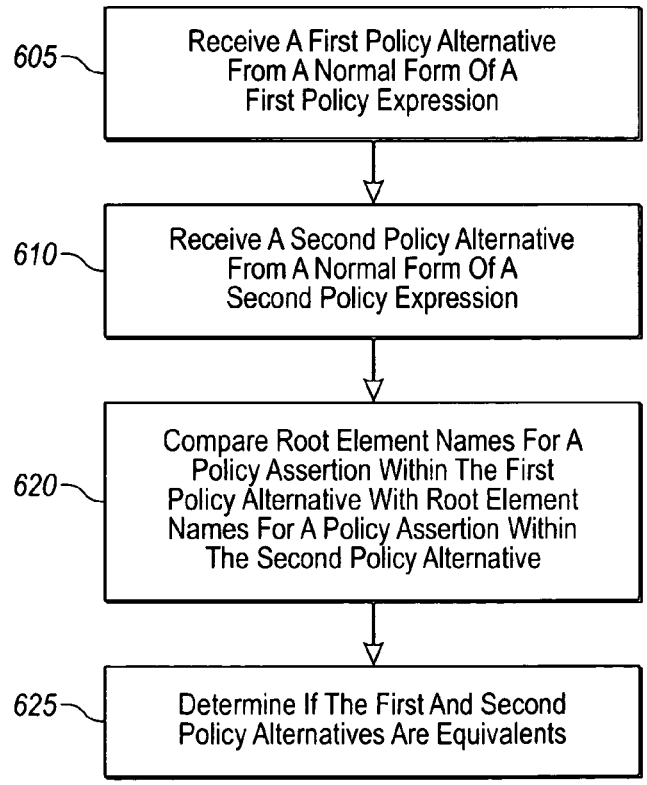
FIG. 6 illustrates a flow diagram of a method of determining the equivalents of two policy alternatives in accordance with example embodiments.

FIG. 6 illustrates a flow diagram of a method 600 of determining the equivalents between two policy expressions by comparing the root element names of assertions within two policy alternatives. Method 600 includes an act of receiving 605 a first policy alternative from a normal form of a first policy expression. The first policy alternative including policy assertions that will satisfy the first policy expression. Method 600 further includes an act of receiving 610 a second policy alternative from a normal form of a second policy expression. The second policy alternative including policy assertions that will satisfy the second policy expression. Thereafter, method 600 also includes an act of comparing 620 root element names for the policy assertion within the first policy alternative with root element names for the policy assertion within the second policy alternative. The root element names may be qualified names for the policy assertions within first and second policy alternatives. In any event, the policy assertions within the first and second policy alternatives may be arranged in alphabetical order for ease in comparing equivalents.

Based on the comparison, method 600 includes an act of determining 625 if the first and second policy alternatives are equivalents. This may be done in order to determine the compatibility of the first and second policy expressions. In yet another embodiment, the first and second policy alternatives are equivalent. In this instance, the assertions within the first alternative may have attributes or children different from the attributes or children from the assertions within the second alternative. Accordingly, an intersection policy document may be created that includes the assertions within the first policy alternative and the assertions within the second policy alternative.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 7. The logical connections depicted in FIG. 7 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computing device in a distributed system, a method of converting a set form of a policy expression into a Boolean form of the policy expression to assist a communications endpoint in complying with the policy expression, the method comprising acts of:

accessing a set form of a policy expression, the set form of the policy expression defined by a plurality of policy assertions arbitrarily constrained by a first group of logical operators, the first group of logical operators configured for defining policy expressions in set form, the set form of the policy expression convertible to any of plurality of other forms of the policy expression, including other forms of the policy expression defined by a plurality of equivalent arbitrary constrained policy assertions, at least one of the other forms being the Boolean form of the policy expression, the Boolean form of the policy expression defined by the plurality of policy assertions arbitrarily constrained by a second different group of logical operators, the second different group of logical operators configured for defining policy expressions in Boolean form, the Boolean form of the policy expression convertible to the set form and any of the plurality of other forms, one or more lines of the Boolean form of the policy expression beginning with a logical operator selected from the second group of logical operators;

utilizing a policy algebra to convert the set form of the policy expression to the Boolean form of the policy expression by converting the plurality of policy assertions constrained by the first group of logical operators to an equivalent plurality of policy assertions constrained by the second group of logical operators, the equivalent plurality of policy assertions representing policy alternatives corresponding to each possible combination of one or more of the plurality of policy assertions that will satisfy the policy expression; and presenting the equivalent plurality of policy assertions to the communications endpoint such that the communications endpoint can identify one of the plurality of policy alternatives from the Boolean form of the policy expression for use in complying with the policy expression.

2. The method of claim 1, wherein the second group of logical operators includes a top-level OR logical operator enclosing the plurality of policy alternatives and each policy alternative from the plurality of policy alternatives are enclosed by AND logical operators.

3. The method of claim 2, wherein logical operators in the second group of logical operators are selected from among:

AND, OR, XOR, XNOR, NAND, NOR, NOT, Optional, Required, Rejected, Ignored, or Observed.

4. The method of claim 3, wherein the set form of the policy expression includes a top-level ExactlyOne operator enclosing the plurality of policy alternatives and each policy alternative from the plurality of policy alternatives are enclosed by All operators.

5. The method of claim 4, wherein logical operators in the first group of logical operators are selected from among ExactlyOne, OneOrMore, All, Optional, Required, Rejected, Ignored, or Observed.

6. The method of claim 5, wherein the policy algebra defines that the ExactlyOne logical operator and the All logical operator are commutative, associative, idempotent, distributive.

7. The method of claim 5, wherein the first group of logical operators and the second group of logical operators do not include any common logical operators.

8. The method of claim 5, wherein accessing a set form of a policy expression comprises an act of accessing a normalized set form of the policy expression, the normalized set form of the policy expression including a top-level ExactlyOne logical operator enclosing at least one All logical operator.

9. The method of claim 8, further comprising prior to accessing the normalized set form of the policy expression:
   accessing a compact set form of the policy expression; and
   converting the compact set form of the policy expression into the normalized set form of the policy expression by enclosing each individual policy alternative in an All logical operator and enclosing the All logical operators within a the top-level ExactlyOne operator.

10. At a computing device in a distributed system, a method of determining policy expression commonality between a sender and a receiver the sender expressing message requirements in accordance with a sender policy expression and the receiver expressing message requirements in accordance with a receiver policy expression, the method comprising acts of:
   accessing the sender policy expression in normal form, the sender policy expression including a sender side group of one or more policy alternatives, each policy alternative in the sender side group including a combination of one or more policy assertions that will satisfy the message requirements expressed in the sender policy expression, each policy assertion in the sender side group including a root element name, having a namespace prefix and a corresponding local name and one or more other elements names;
   accessing the receiver policy expression in normal form, the receiver policy expression including a receiver side group of one or more policy alternatives, each policy alternative in the receiver side group including a combination of one or more policy assertions that will satisfy the message requirements expressed in the receiver policy expression, each policy assertion in the receiver side group including a root element name, having a namespace prefix and a corresponding local name, and one or more other element names;
   comparing each policy alternative in the sender side group to each policy alternative in the receiver side group;
   based on the comparison, determining that one or more policy alternatives in the sender side group have a common vocabulary with a corresponding one or more policy alternatives in the receiver side group respectively; and
   for each policy alternative from the sender group that has a common vocabulary with a policy alternative from the receiver group:
      creating an intersection policy expression from the policy alternative from the sender group and the policy alternative from the receiver group, the intersection policy representing the union of the policy alternative from the sender group and the policy alternative from the receiver group so as to indicate a single policy alternative that is admissible to both the sender and the receiver.

11. The method of claim 10, wherein comparing each policy alternative in the sender side group to each policy alternative in the receiver side group comprises comparing root element names for policy alternatives in the sender side group to root element names for policy alternatives in the receiver side group.

12. The method of claim 10, wherein comparing each policy alternative in the sender side group to each policy alternative in the receiver side group comprises comparing the one more other elements in a policy alternative in the sender side group to one or more other elements in a policy alternative in the received side group when root element names between the policy alternatives match.

13. A computer program product for use at a computing device in a distributed system, the computer program product for implementing a method of applying an algebraic solution to convert a set form of a policy expression into a Boolean form of the policy expression to support versioning message requirements, and other capabilities at various endpoints within the distributed system, the computer program product comprising one or more computer readable media having stored thereon computer executable instructions that, when executed by a processor, cause the computing device to perform the following:
   access a set form of a policy expression, the set form of the policy expression defined by a plurality of policy assertions arbitrarily constrained by a first group of logical operators, the first group of logical operators configured for defining policy expressions in set form, the set form of the policy expression convertible to any of plurality of other forms of the policy expression, including other forms of the policy expression defined by a plurality of equivalent arbitrary constrained policy assertions, at least one of the other forms being the Boolean form of the policy expression, the Boolean form of the policy expression defined by the plurality of policy assertions arbitrarily constrained by a second different group of logical operators, the second different group of logical operators configured for defining policy expressions in Boolean form, the Boolean form of the policy expression convertible to the set form and any of the plurality of other forms, one or more lines of the Boolean form of the policy expression beginning with a logical operator selected from the second group of logical operators;
   utilize the policy algebra to convert the set form of the policy expression to the Boolean form of the policy expression by converting the plurality of policy assertions constrained by the first group of logical operators to an equivalent plurality of policy assertions constrained by the second group of logical operators, the equivalent plurality of policy assertions representing policy alternatives corresponding to each possible combination of one or more of the plurality of policy assertions that will satisfy the policy expression;
   expand the Boolean form of the policy expression into a semi-normal Boolean form of the policy expression including a top-level logical operator selected from among the second group of logical operators, the top-level logical operator enclosing one or more other logical operators selected from among the second group of logical operators;

expand the semi-normal Boolean form into a disjunctive normal Boolean form of the policy expression, expanding into the disjunctive normal Boolean form including replacing elements indicated as optional in the semi-normal Boolean form with equivalent logical operators from the second group of logical operators; and present the disjunctive normal Boolean form of the policy expression to the communications endpoint such that the communications endpoint can identify one of the plurality of policy alternatives from the disjunctive normal Boolean form for use in complying with the policy expression.

14. The computer program product of claim 13, wherein computer-executable instructions that, when executed, cause the computing device to expand the Boolean form of the policy expression into a semi-normal Boolean form of the policy expression comprise computer-executable instructions that, when executed, cause the computing device to expand the Boolean form of the policy expression into a semi-normal Boolean form of the policy expression including a top-level OR logical operator enclosing the equivalent plurality of policy alternatives, each policy alternative enclosed by an AND logical operators.

15. The computer program product of claim 14, wherein logical operators in the second group of logical operators are selected from among: AND, OR, XOR, XNOR, NAND, NOR, NOT, Optional, Required, Rejected, Ignored, or Observed.

16. The computer program product of claim 13, wherein the set form of the policy expression includes a top-level ExactlyOne operator enclosing the plurality of policy alternatives and each policy alternative from the plurality of policy alternatives are enclosed by All operators.

17. The computer program product of claim 16, wherein logical operators in the first group of logical operators are selected from among include: ExactlyOne, OneOrMore, All, Optional, Required, Rejected, Ignored, or Observed.

18. The computer program product of claim 17, wherein the first group of logical operators and the second group of logical operators do not include any common logical operators.

19. The computer program product of claim 17, wherein the policy algebra defines that the ExactlyOne logical operator and the All logical operator are commutative, associative, idempotent, distributive.

20. The computer program product of claim 16, wherein computer-executable instructions that, when executed, cause the computing device to access a set form of a policy expression comprise wherein computer-executable instructions that, when executed, cause the computing device to access a normalized set form of the policy expression.

* * * * *